United States Patent
Masuda et al.

(10) Patent No.: US 6,912,391 B2
(45) Date of Patent: Jun. 28, 2005

(54) HAND OVER CONTROL METHOD, BASE STATION CONTROLLER AND MOBILE TERMINAL

(75) Inventors: Satoshi Masuda, Yokohama (JP); Shirou Mazawa, Fujisawa (JP); Manabu Yoshimura, Fujisawa (JP); Masato Inagaki, Fujisawa (JP); Yoshio Takauchi, Saitama (JP); Akira Yamaguchi, Tokyo (JP)

(73) Assignees: Hitachi, Ltd., Tokyo (JP); KDDI Corporation, Tokyo (JP)

( * ) Notice: Subject to any disclaimer, the term of this patent is extended or adjusted under 35 U.S.C. 154(b) by 499 days.

(21) Appl. No.: 09/925,500

(22) Filed: Aug. 10, 2001

(65) Prior Publication Data

US 2002/0037725 A1 Mar. 28, 2002

(30) Foreign Application Priority Data

Sep. 19, 2000 (JP) .................................. 2000-283939

(51) Int. Cl.[7] ................................................ H04Q 7/00
(52) U.S. Cl. .................. 455/442; 455/436; 455/560; 455/561; 370/331; 375/130
(58) Field of Search ................ 455/436–443, 455/424–425, 432.1, 67.11, 68–69, 560–561, 434, 550.1, 552.1; 370/329, 335–342, 331, 320, 332; 375/130, 134–135, 137, 140, 145

(56) References Cited

U.S. PATENT DOCUMENTS 5,848,358 A * 12/1998 Forssen et al. ............. 455/437
6,259,918 B1 * 7/2001 Labonte et al. ............. 455/436
6,344,821 B2 * 2/2002 Norimatsu ................... 370/324
6,526,028 B1 * 2/2003 Kondo ......................... 455/442
6,539,009 B1 * 3/2003 Zhou et al. .................. 370/342
6,539,234 B1 * 3/2003 Hiramatsu et al. .......... 455/522
6,628,631 B1 * 9/2003 Mazawa et al. ............. 455/436
6,650,686 B1 * 11/2003 Kondo ......................... 455/442
6,697,622 B1 * 2/2004 Ishikawa et al. ............ 455/434
6,711,149 B1 * 3/2004 Yano et al. .................. 455/437

FOREIGN PATENT DOCUMENTS

| JP | 08018503 | 1/1996 |
|----|----------|--------|
| JP | 217139 | 8/2000 |
| JP | 036964 | 2/2001 |

* cited by examiner

Primary Examiner—Emmanuel L. Moise
Assistant Examiner—Kamran Afshar
(74) Attorney, Agent, or Firm—Mattingly, Stanger, Malur & Brundidge, P.C.

(57) ABSTRACT

A method of controlling hand over that reliably performs SHO even when there exists discrepancy between a range of a cell or sector and a range in which communication is possible. A reference value, which is compared with a received level of a perch channel signal for judging timing of starting and ending SHO, is corrected by using a correction value prepared for each combination of an SHO source cell and an SHO destination cell. The reference value is corrected such that SHO is started when the mobile station 10 arrives at a range in which the mobile station 10 can communicate with a base station 21 that covers the SHO destination candidate cell, and the hand over is ended when the mobile station 10 comes out of a range in which the mobile station 10 can communicate with a base station that covers the SHO source cell.

11 Claims, 15 Drawing Sheets

MOBILE STATION 10

FIG.4

SHO CORRECTION VALUE TABLE

SHO DESTINATION CANDIDATE CELL 2222

SHO SOURCE CELL 2221

|        | CELL 1       | CELL 2       | ...... | CELL n       |
|--------|--------------|--------------|--------|--------------|
| CELL 1 |              | $\Delta_{12}$ | ...... | $\Delta_{1n}$ |
| CELL 2 | $\Delta_{21}$ |              | ...... | $\Delta_{2n}$ |
| ⋮      | ⋮            | ⋮            | ...... | ⋮            |
| CELL n | $\Delta_{n1}$ | $\Delta_{n2}$ | ...... |              |

2223

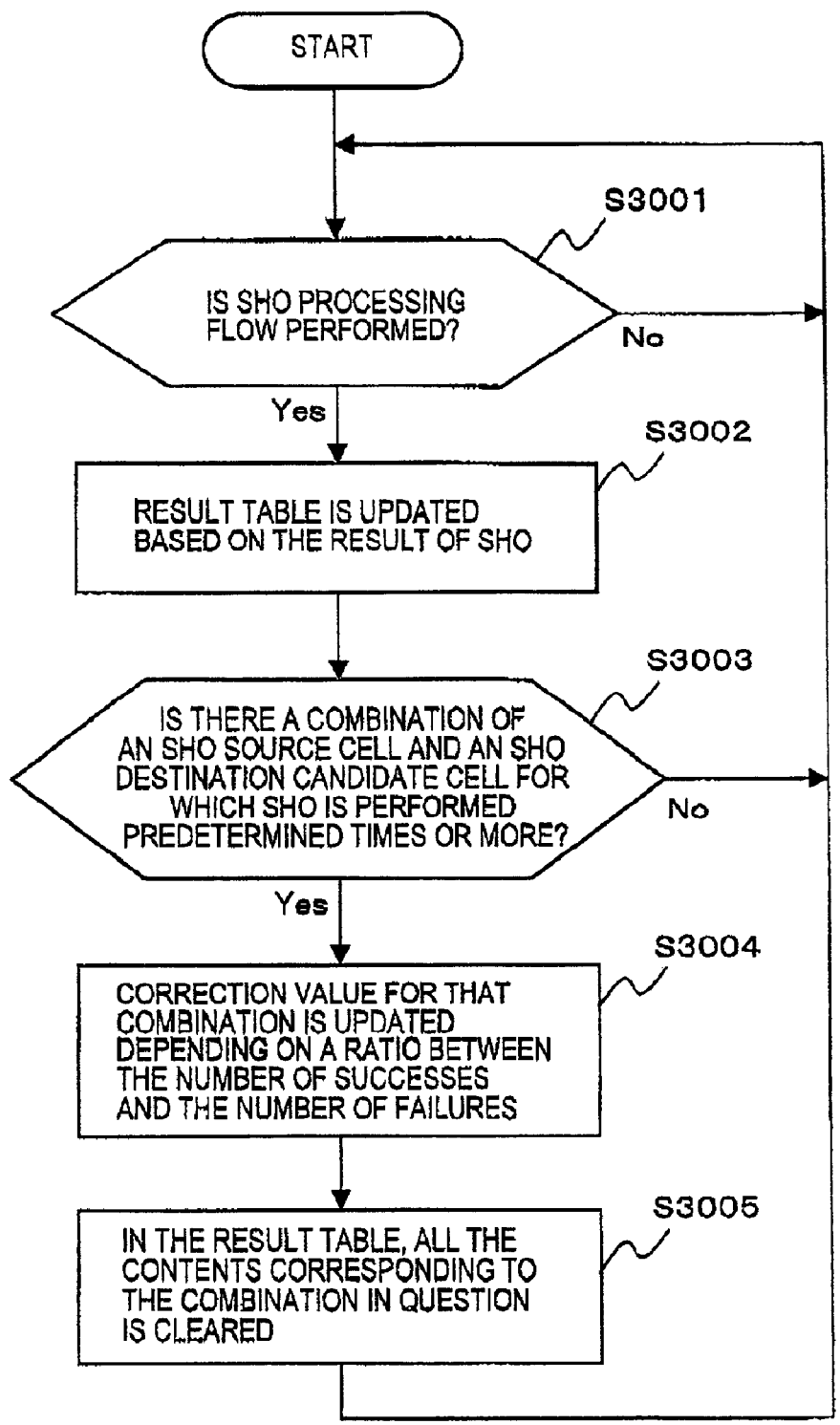

FIG. 8

RESULT TABLE

SHO DESTINATION CANDIDATE CELL 2222

| SHO SOURCE CELL 2221 | CELL 1 | | CELL 2 | | ... | CELL n | |
|---|---|---|---|---|---|---|---|
| | NUMBER OF SHO PERFORMED | | NUMBER OF SHO PERFORMED | | ... | NUMBER OF SHO PERFORMED | |
| | NUMBER OF SUCCESSFUL STARTS | NUMBER OF SUCCESSFUL ENDS | NUMBER OF SUCCESSFUL STARTS | NUMBER OF SUCCESSFUL ENDS | ... | NUMBER OF SUCCESSFUL STARTS | NUMBER OF SUCCESSFUL ENDS |
| CELL 1 | — | | | | ......... | | |
| CELL 2 | NUMBER OF SHO PERFORMED | | — | | ......... 2225 | NUMBER OF SHO PERFORMED | |
| | NUMBER OF SUCCESSFUL STARTS | NUMBER OF SUCCESSFUL ENDS | | | | NUMBER OF SUCCESSFUL STARTS 2226 | NUMBER OF SUCCESSFUL ENDS 2227 |
| CELL n | ......... | | ......... | | ......... | — | |

MOBILE STATION 10'

SHO CONTROL UNIT 18

HAND OVER CONTROL METHOD, BASE STATION CONTROLLER AND MOBILE TERMINAL

BACKGROUND OF THE INVENTION

The present invention relates to a method of controlling hand over, in which timing of starting or ending hand over is judged by comparing a received level of a perch channel signal at a mobile station with a reference value, and, in particular, to a method of controlling hand over, which is suitable for controlling soft hand over in cellular mobile communication using Code Division Multiple Access (CDMA) system.

CDMA is one of the multiple access systems, and has advantages over Frequency Division Multiple Access (FDMA) and Time Division Multiple Access (TDMA) in simplicity of frequency allocation etc. Accordingly, CDMA is employed as a multiple access system in recent cellular mobile communication systems such as EIA/TIA IS-95 etc.

CDMA has a channel switching system called Soft Hand Over (SHO), which is unique to CDMA. SHO is realized when a mobile station communicates simultaneously with a plurality of base stations, and has an advantage that communication can be continued without a short break when a mobile station moves from a cell to another cell. Further, as disclosed in Japanese Unexamined Patent Laid-Open No. 8-18503, transmit power can be reduced since a mobile station can control a transmit power level of a traffic channel signal, depending on the base station having the best communication quality among the base stations simultaneously communicating with that mobile station.

In the following, will be described an outline of the conventional SHO, referring to FIG. 14.

In FIG. 14, boundaries C1, C2 that define ranges of cells covered by base stations $60_1$, $60_2$ are defined by received levels of perch channel signals transmitted all the time from the base stations $60_1$, $60_2$, respectively. Those perch channel signals are transmitted at a predetermined level of transmit power, usually modulated with the same frequency signal, and spread with different spread codes respectively for different base stations. The inside area of the boundary C1 on the side of the base station $60_1$ is the cell range covered by the base station $60_1$, and the inside area of the boundary C2 on the side of the base station $60_2$ is the cell range covered by the base station $60_2$. Now, will be considered the case in which a mobile station 50 communicating (through a traffic channel) with the base station $60_1$ moves in the direction of the arrow A. When the mobile station 50 crosses the boundary C2, the mobile station 50 recognizes that it has entered the cell covered by the base station $60_2$ based on the measurement result of the received level of the perch channel signal. Then, the mobile station 50 starts SHO, trying to establish communication with the base station $60_2$. On the other hand, when the mobile station 50 crosses the boundary C1, it recognizes that it comes out of the cell covered by the base station $60_1$ based on the measurement result of the received level of the perch channel signal. Then, the mobile station 50 ends SHO to disconnect communication with the base station $60_1$, and communicates with the base station $60_2$ only.

SUMMARY OF THE INVENTION

The above-mentioned conventional SHO assumes that the range of the cell covered by a base station coincides with the range in which the base station can actually communicate (through a traffic channel). However, as described above, the range of the cell covered by a base station is decided by a received level of the perch channel signal at a mobile station, while the perch channel signal is transmitted from the base station. On the other hand, the range in which the base station in question can actually communicate is decided by a received level of the down-link traffic channel signal, which is transmitted from the base station, at the mobile station and a received level of the up-link traffic channel signal, which is transmitted from the mobile station, at the base station in question. These levels depend on the antenna gains, the number of mobile stations in communication with the base station in question, etc. Accordingly, sometimes, there occurs a discrepancy between the range of the cell covered by the base station and the range in which the base station in question can actually communicate.

Thus, when the above-mentioned SHO is performed in the state that the range of the cell covered by the base station is different from the range in which the base station in question can actually communicate, the following problems arise.

1. When it is tried to start SHO, sometimes communication with the base station (SHO destination base station) covering the destination cell of SHO can not be established.

For example, as shown in FIG. 15, it is assumed that the range of the cell covered by the base station $60_1$ (i.e., the inside area of the boundary C1 on the side of the base station $60_1$) is narrower than the range in which the base station $60_1$ in question can actually communicate (i.e., the inside area of the boundary H1 on the side of the base station $60_1$), and that the range covered by the base station $60_2$ (i.e., the inside area of the boundary C2 on the side of the base station $60_2$) is wider than the range in which the base station $60_2$ in question can actually communicate (i.e., the inside area of the boundary H2 on the side of the base station $60_2$). Further, it is assumed that a mobile station 50 in communication with the base station $60_1$ moves in the direction of the arrow A. In this case, when the mobile station 50 crosses the boundary C2, the mobile station 50 recognizes that it has entered the cell covered by the base station $60_2$ based on the measurement result of the received level of the perch channel signal. Then, the mobile station 50 starts SHO to try to communicate with the base station $60_2$. However, since the mobile station 50 has not crossed the boundary H2, the mobile station 50 can not establish communication with the base station $60_2$. As a result, the mobile station 50 repeats start and failure of SHO until the mobile station 50 arrives at a position where it crosses the boundary H2, casting an unnecessary burden on the base station $60_2$ and the network, and wasting resources of the base station $60_2$ and the network.

2. Sometimes, immediately after starting SHO, communication with the base station (SHO source base station) that covers the source cell of SHO is disconnected.

For example, as shown in FIG. 16, it is assumed that the range of the cell covered by the base station $60_1$ (i.e., the inside area of the boundary C1 on the side of the base station $60_1$) is wider than the range in which the base station $60_1$ in question can actually communicate (i.e., the inside are of the boundary H1 on the side of the base station $60_1$), and that the range of the cell covered by the base station $60_2$ (i.e., the inside area of the boundary C2 on the side of the base station $60_2$) is narrower than the range in which the base station $60_2$ in question can actually communicate (i.e., the inside area of the boundary H2 on the side of the base station $60_2$). Further, it is assumed that a mobile station 50 in communication with the base station $60_1$ moves in the direction of the arrow A.

In this case, when the mobile station 50 crosses the boundary C2, the mobile station 50 recognizes that it has entered the cell covered by the base station $60_2$ based on the measurement result of the received level of the perch channel signal. Thus, then, the mobile station 50 starts SHO to try to communicate with the base station $60_2$. Further, for example, according to the technique described in Japanese Unexamined Patent Laid-Open No. 8-18503, the mobile station 50 controls the transmit power level of the traffic channel signal depending on the base station having the best communication quality. In that case, in the example shown in FIG. 16, when the mobile station 50 crosses the boundary C2, the mobile station 50 has already come out of the range delimited by the boundary H1, in which the base station $60_1$ can actually communicate, and at the same time, the mobile station 50 has arrived at the range delimited by the boundary H2 in which the base station $60_2$ can actually communicate. Accordingly, the mobile station 50 controls the transmit power level, adapting to the base station $60_2$. As a result, the base station $60_1$ can not receive the up-link traffic channel from the mobile station 50, and the communication with the mobile station is disconnected. In other words, immediately after performing the soft hand over, communication with the base station $60_1$ is disconnected, and the advantages of soft hand over such as the above-mentioned stability of communication and reduction in transmit power can be scarcely obtained.

The present invention has been completed, taking the above-described circumstances into consideration. An object of the present invention is to make it possible to perform hand over more reliably even when there exists a discrepancy between a range of a cell or sector and a range in which communication can be effectuated.

To attain the above object, according to the method of controlling hand over in the mobile communication system, of the present invention, a reference value, which is compared with a received level of a perch channel signal to judge timing of starting or ending hand over, is corrected, such that the hand over is started when a mobile station arrives at a range in which the mobile station can communicate with a base station of the hand over destination, and the hand over is ended when the mobile station comes out of a range in which the mobile station can communicate with a base station of the hand over source. Or, instead of correcting a reference value, a transmitting level of a perch channel signal of the base station of the hand over destination or the base station of the hand over source is adjusted.

In detail, according to a first mode of the present invention, a correction value is prepared in advance for each combination of a source cell (or source sector) and a destination cell (or destination sector) of hand over. Here, it is sufficient if, for each above-mentioned combination, a received level of a perch channel signal of a base station of the hand over destination or of the hand over source, which is received at a point where the hand over can be normally started or ended, is measured in advance, and the correction value is decided in advance based on a difference between the received level and the above-mentioned reference value. Or, the correction value may be decided in advance, based on a difference between a transmitting level of a perch channel signal of a base station of the hand over source and a transmitting level of a perch channel signal of a base station of the hand over destination, and a difference between a transmitting level of a traffic channel signal of the base station of the hand over source and a transmitting level of a traffic channel signal of the base station of the hand over destination.

Then, a combination of a source cell (or source sector) and a destination cell (or destination sector) as objects of hand over to be started or ended is recognized. The above-mentioned reference value is corrected using a correction value prepared in advance for thus-recognized combination. And, timing of starting or ending of the hand over is judged using the corrected reference value.

Further, according to a second mode of the present invention, for each above-mentioned combination, at least one result (success or failure) of judging said timing using the above-mentioned reference value is accumulated. Then, the reference value is corrected depending on the accumulated result(s). And, this corrected reference value is set as a new reference value that is used when timing of starting or ending hand over is judged anew with respect to said combination.

Further, according to a third mode of the present invention, for each above-mentioned combination, at least one result (success or failure) of judging said timing using the above-mentioned reference value is accumulated, and a transmitting level of a perch channel signal of a base station of the hand over source or destination is adjusted depending on the accumulated result(s).

BRIEF DESCRIPTION OF THE DRAWINGS

FIG. 4 shows an example of an SHO correction value table that is stored in an SHO correction value table storage unit 222 shown in FIG. 2;

FIG. 7 is a flowchart for explaining correction value update processing that is performed in the SHO control unit 221 of the base station controller 22 shown in FIG. 2, in a third embodiment of the present invention;

FIG. 8 shows an example of a result table that is stored in the SHO correction value table storage unit 222 shown in FIG. 2 in the third embodiment of the present invention;

DETAILED DESCRIPTION OF THE PREFERRED EMBODIMENTS

In the following, embodiments of the present invention will be described, taking a case in which the present invention is applied to a cellular mobile communication system using the CDMA system, as an example.

Now, a first embodiment of the present invention will be described.

Figure 1:
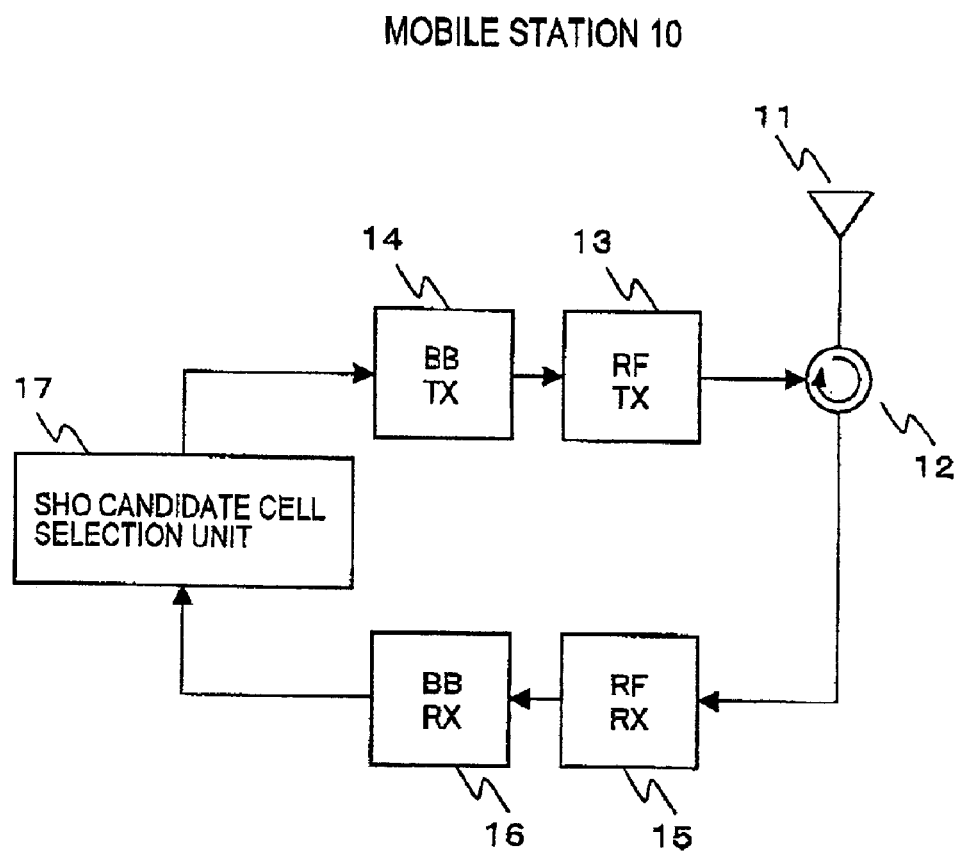
FIG. 1 is a block diagram showing a mobile station 10 used in a cellular mobile communication system to which a first embodiment of the present invention is applied.

FIG. 1 is a block diagram showing a mobile station 10 used in a cellular mobile communication system to which the first embodiment of the present invention is applied.

In the figure, a signal received through a mobile station antenna 11 is inputted into a mobile station radio receiving unit (RFRX) 15 through a mobile station transmission/reception isolation unit 12, In the mobile station radio receiving unit (RFRX) 15, the received signal is subjected to despreading/demodulation processing according to a spread code/modulation frequency that are employed by each base station and notified from an SHO candidate cell selection unit 17, to restore a perch channel signal of each cell. A mobile station base band receiving unit (BBRX) 16 measures a received level of the perch channel signal of each cell, which is restored by the mobile station radio receiving unit 15, and notifies the results to the SHO candidate cell selection unit 17.

Receiving the results, the SHO candidate cell selection unit 17 extracts the received level of the perch channel signal of the cell (SHO source cell) with which its own mobile station 10 is in communication (communication by a traffic channel signal), and the received level of the perch channel signal of the cell (SHO destination candidate cell) which is other than the SHO source cell and whose measurement is largest and over a predetermined value, out of the notified received levels. Then, the SHO candidate cell selection unit 17 notifies those levels to a mobile station base band transmitting unit (BBTX) 14. The mobile station base band transmitting unit 14 generates SHO information that includes the received levels of the perch channels of the SHO source cell and SHO destination candidate cell, which are notified from the SHO candidate cell selection unit 17. Then, the mobile station base band transmitting unit 14 notifies the SHO information to a mobile station radio transmitting unit (RFTX) 13. The mobile station radio transmitting unit 13 performs modulation/spreading processing on the SHO information according to the spread code/modulation frequency employed by the base station that covers the cell (SHO source cell) with which its own mobile station 10 is in communication, to transmit the processed SHO information from the mobile station antenna 11 through the mobile station transmission/reception isolation unit 12.

Here, processing in the mobile station 10 to communicate with a base station through a traffic channel signal is same as the processing in a mobile station of the existing CDMA cellular mobile communication system, and therefore, its detailed description is omitted.

Figure 2:
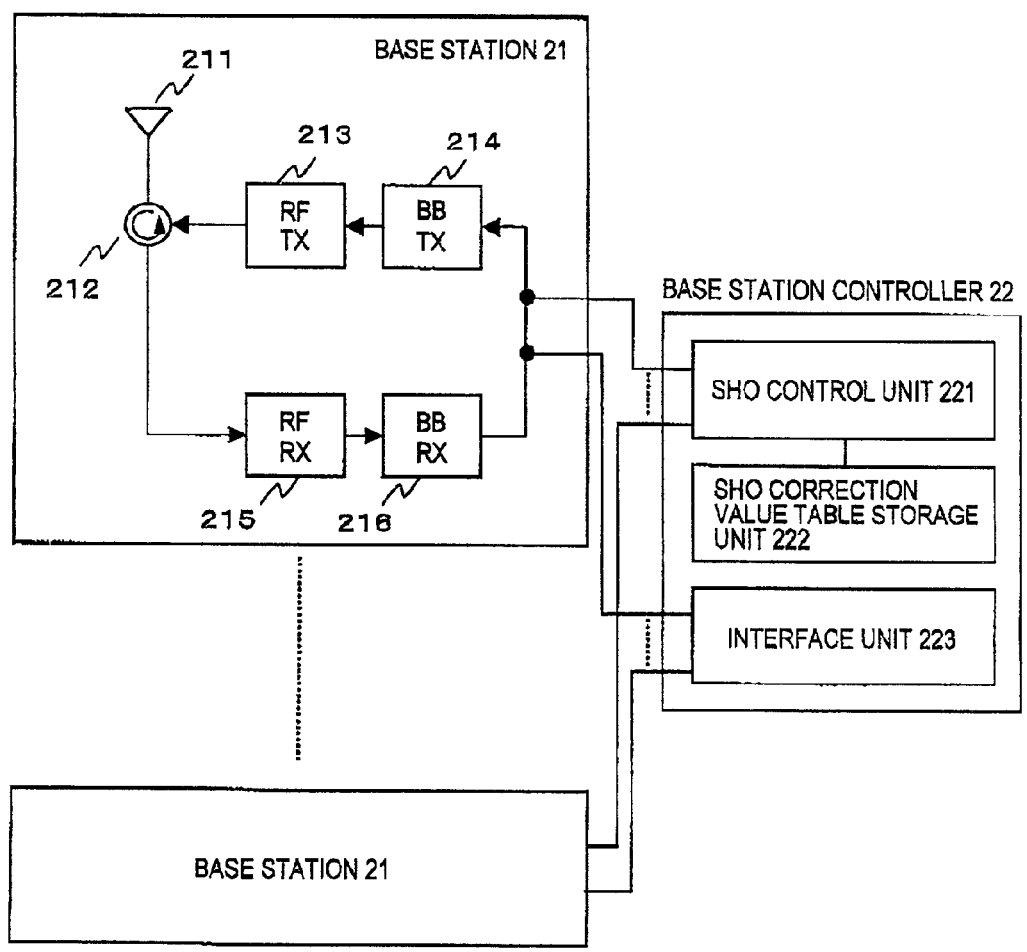
FIG. 2 is a block diagram showing a base station system 20 used in the cellular mobile communication system to which the first embodiment of the present invention is applied.

FIG. 2 is a block diagram showing a base station system 20 used in the cellular mobile communication system to which the first embodiment of the present invention is applied.

As shown in the figure, the base station system 20 used in the present embodiment comprises at least two base stations 21 and a base station controller 22.

In a base station 21, a perch channel signal for deciding the range of the cell covered by the base station 21 itself is generated by a base station base band transmitting unit (BBTX) 214, subjected to modulation/spreading processing by a base station radio transmitting unit (RFTX) 213 according to the spread code/modulation frequency employed by the base station 21 itself, and thereafter, transmitted from a base station antenna 211 through a base station transmission/reception isolation unit 212.

On the other hand, a signal received through the base station antenna 211 is inputted to a base station radio receiving unit (RFRX) 215, and there, subjected to despreading/demodulation processing according to the spreading code/modulation frequency employed by the base station 21 itself. By this operation, a signal transmitted from each mobile station 10 in communication (communication through a traffic channel) with the base station 21 itself is extracted. From the signal of each mobile station 10, which is extracted by the base station radio receiving unit (RFRX) 215, a base station base band receiving unit (BBRX) 216 extracts SHO information.

Here, processing in a base station 21 to communicate with a mobile station 10 through a traffic channel signal is same as the processing in a base station of the existing CDMA cellular mobile communication system, and therefore, its detailed description is omitted.

As shown in the figure, the base station controller 22 comprises an SHO control unit 221, an SHO correction value table storage unit 222, and an interface unit 223. A traffic channel signal, which each base station 21 transmits or receives to or from each mobile station 10, is received or transmitted from or to, for example, a public network through the interface unit 223. Based on SHO information that is notified from each base station 21 in relation to each mobile station 10 with which the base station 21 in question is communicating, the SHO control unit 221 judges if SHO is necessary for each mobile station 10 concerned, and performs SHO. With respect to each combination of an SHO source cell and an SHO destination candidate cell, the SHO correction value table storage unit 222 stores a correction value for correcting a reference value (received level of a perch channel signal) used for deciding timing of starting and ending SHO.

Next, will be described SHO processing performed in the SHO control unit 221 of the base station controller 22.

Figure 3:
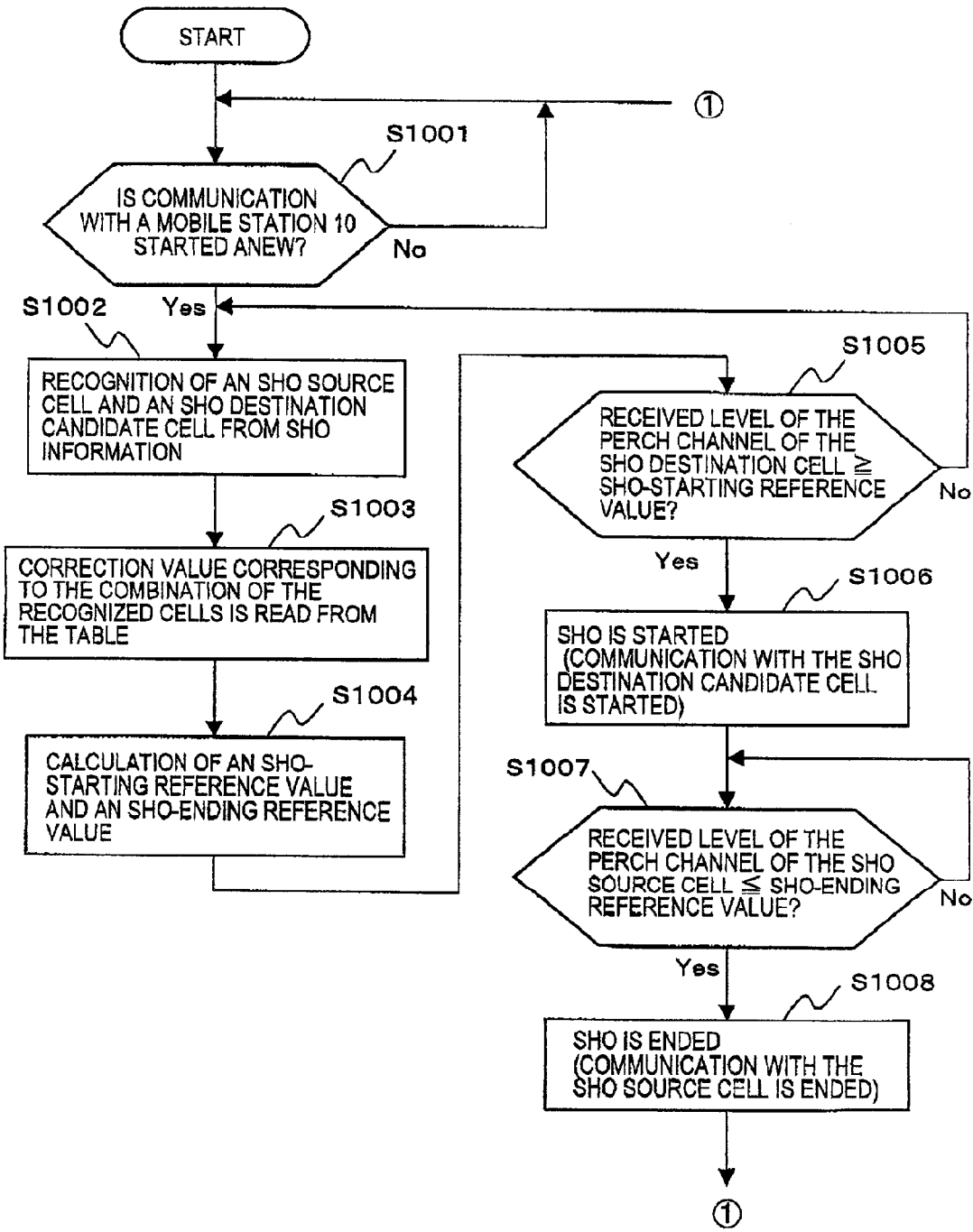
FIG. 3 is a flowchart for explaining SHO processing that is performed in an SHO control unit 221 of a base station controller 22 shown in FIG. 2.

FIG. 3 is a flowchart for explaining SHO processing that is performed in the SHO control unit 221 of the base station controller 22. This flow is performed for each mobile station 10 communicating with some base station 21.

First, when some base station 21 transmits SHO information of a mobile station 10 that starts communication with the base station 21 in question anew, to the SHO control unit 221 (Step S1001), then, the SHO control unit 221 recognizes an SHO source cell and an SHO destination candidate cell that are included in the SHO information (Step S1002). Then, the SHO control unit 221 reads the correction value corresponding to the combination of the recognized SHO source cell and SHO destination candidate cell, from the SHO correction value table storage unit 222 (Step 51003).

Now, the correction value will be described here. FIG. 4 shows an example of an SHO correction value table stored in the SHO correction value table storage unit 222.

As shown in the figure, for each combination of an SHO source cell 2211 and an SHO destination candidate cell 2222 covered by the base stations 21 connected to the base station controller 22, the SHO correction value table is entered with a correction value 2223 for correcting a reference value (usually, determined in advance as a received level of the perch channel signal in the neighborhood of the cell boundary) used for judging timing of performing SHO. Here, this correction value is decided in advance for each combination of an SHO source cell and an SHO destination candidate cell, considering discrepancy between the range of the SHO source cell and the range in which the base station covering the cell in question can communicate, and discrepancy between the range of the SHO destination cell and the range in which the base station covering the cell in question can communicate, such that SHO is started (i.e., communication with the SHO destination candidate is started) when a mobile station 10 arrives at the range in which it can communicate with a base station 21 that covers the SHO destination candidate cell, and SHO is ended (i.e., communication with the SHO source cell is ended) when the mobile station 10 in question comes out of the range in which it can communicate with a base station 21 that covers the SHO source cell.

In the following, will be described two examples of a method of deciding such a correction value. Now, a first example will be described referring to FIG. 5.

Figure 5A:
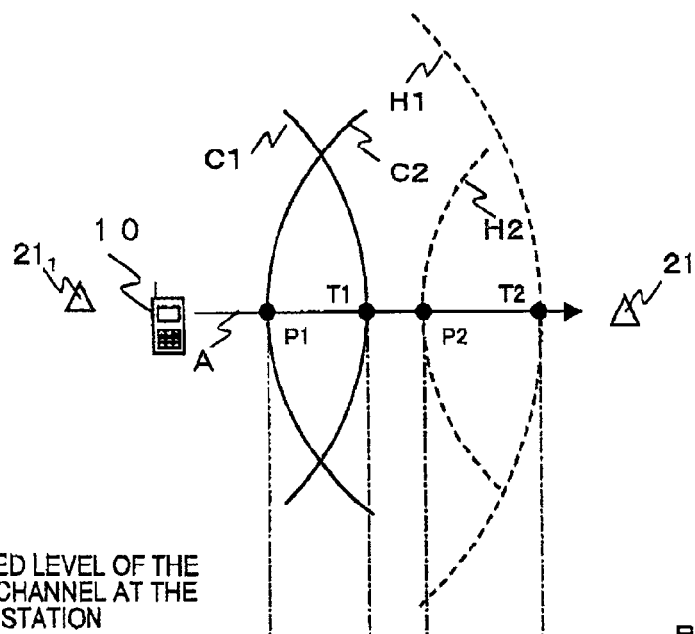
FIGS. 5A to 5C are diagrams for explaining an example of a method of deciding a correction value that is to be registered in the SHO correction value table.

As shown in FIG. 5A, it is assumed that the range of a cell covered by a base station $21_1$ (i.e., the inside area of the boundary C1 on the side of the base station $21_1$) is narrower than the range in which the base station $21_1$ in question can actually communicate (i.e., the inside area of the boundary H1 on the side of the base station $21_1$), and the range of a cell covered by a base station $21_2$ (i.e., the inside area of the boundary C2 on the side of the base station $21_2$) is wider than the range in which the base station $21_2$ in question can actually communicate (i.e., the inside area of the boundary H2 on the side of the base station $21_2$).

Figure 5B:
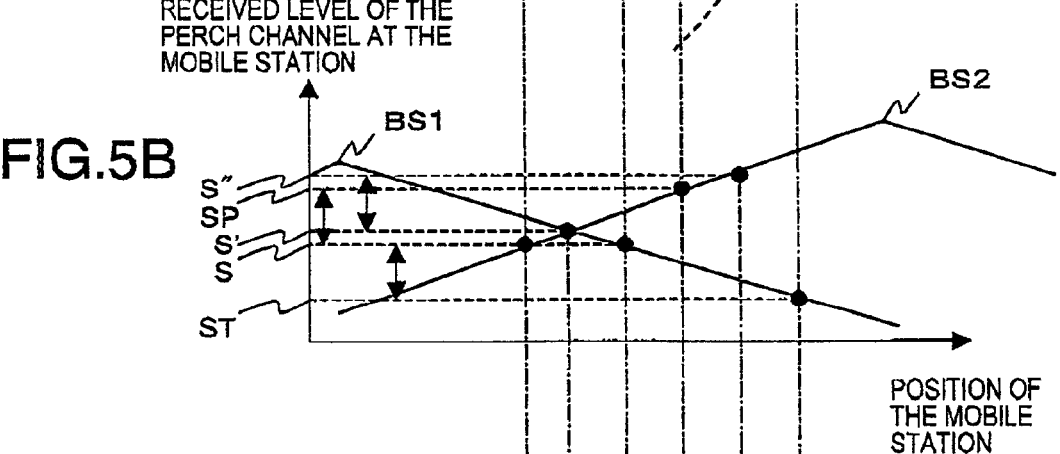
Figure 5C:
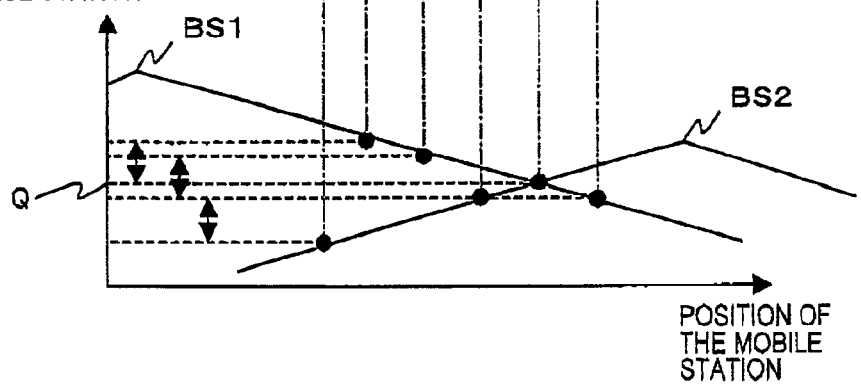

As shown in FIG. 5B, with respect to the perch channel signals transmitted from the base stations $21_1$, $21_2$, their factors of attenuation owing to distance from the base station concerned are almost same, irrespective of the transmit powers of the signals concerned. Further, as shown in FIG. 5C, also with respect to the traffic channel signal transmitted from the mobile station 10, their factors of attenuation owing to distance from the mobile station concerned are almost same, irrespective of the transmit powers of the signals concerned.

Accordingly, when, as shown in FIG. 5A, the mobile station 10 moves in the direction of the arrow A (namely, the SHO source cell is the cell of the base station $21_1$ and the SHO destination candidate cell is the cell of the base station $21_2$), a difference (S–SP) between the received level S (=reference value) of the perch channel signal of the base station $21_2$ at the time when the mobile station 10 arrives at a point P1 on the boundary C2 and the received level SP of the perch channel signal of the base station $21_2$ at the time when the received level of the traffic channel signal, at the base station $21_2$, of the mobile station 10 rises to a level Q at which communication is actually possible (namely, when the mobile station 10 arrives at a point P2 on the boundary H2) is almost equal to a difference (S'–S") between the received level S' of the perch channel signals received from the base stations $21_1$ and $21_2$ at the time when received levels of those perch channel signals become equal to each other and the received level S" of the perch channel signal of the base station $21_2$ at the time when the received levels of the traffic channel signals, at the base stations $21_1$ and $21_2$, received from the mobile station 10 become equal to each other. Further, these differences are almost equal to a difference (S–ST) between the received level S (=reference value) of the perch channel signal of the base station $21_1$ at the time when the mobile station 10 arrives at a point T1 on the boundary C1 and the received level ST of the perch channel signal of the base station $21_1$ at the time when the received level of the traffic channel signal of the mobile station 10 falls, at the base station $21_1$, to the level Q at which communication is actually possible (namely, when the mobile station 10 arrives at a point T2 on the boundary H1), with the signs being reversed.

Accordingly, in the combination of the cell of the base station $21_1$ as the SHO source cell and the cell of the base station $21_2$ as the SHO destination candidate cell, communication with the cell of the base station $21_2$ can be performed reliably, if SHO is started at the time when the received level of the perch channel signal of the base station $21_2$ is S–(S'–S"). Further, the communication with the cell of the base station $21_2$ can be ended if SHO is ended at the time when the received level of the perch channel signal of the base station $21_1$ is S+(S'–S").

Thus, for each combination of an SHO source cell and an SHO destination candidate cell, the above-mentioned difference (S'–S") is obtained and registered into the SHO correction value table, beforehand. Here, of course, with respect a combination of cells whose base stations are geographically so distant from each other that there is no possibility of performing SHO between them, it is not necessary to obtain the above correction value in advance.

Further, in the above-described example shown in FIG. 5, with respect to a combination of the cell of the base station $21_2$ as the SHO source cell and the cell of the base station $21_1$ as the SHO destination candidate cell (namely, in the case where the mobile station 10 moves in the reverse direction to the arrow A in FIG. 5A), the correction value is set as the same but reversely-signed value as the correction value for the combination of the cell of the base station $21_1$ as the SHO source cell and the cell of the base station $21_2$ as the SHO destination candidate cell.

Next, a second example of the method of deciding a correction value will be described, referring to FIG. 5.

As shown in FIG. 5B, with respect to the perch channel signals transmitted from the base station $21_1$, $21_2$, their factors of attenuation owing to distance from the base station concerned are almost same, irrespective of the transmit powers of the signals concerned. Accordingly, if this attenuation factor is known, it is possible to obtain the received level S' of the perch channel signals of the base stations $21_1$, $21_2$ at the time when the received levels of those perch channel signals become equal to each other, based on respective transmit powers of the perch channel signals of the base stations $21_1$, $21_2$. Now, symbols $W_1$, $W_2$ respectively refer to the transmit powers of the perch channel signals of the base stations $21_1$, $21_2$, $-\alpha$ to the attenuation factor per a unit distance, L to the distance between the base stations $21_1$, $21_2$, and x to the distance of the mobile station 10 from the base station $21_1$. In this case, the received level S' is obtained from the following equation (1).

$$S'=W_1-\alpha x=W_2-\alpha(L-X) \quad (1)$$

$$\rightarrow S'=((W_1+W_2)-\alpha L)/2$$

As shown in FIG. 5C, with respect to the traffic channel signal transmitted from the mobile station 10, their attenuation factors owing to distance are almost same, at any of the base stations $21_1$, $21_2$. Accordingly, when this attenuation factor is known, it is possible to obtain the point where the received levels of the traffic channel signals at the base stations $21_1$, $21_2$ become equal, based on the transmit power of the traffic channel signal of the mobile station 10 and receiving antenna gains at the base stations $21_1$, $21_2$. Now, a symbol P refers to the transmit power of the traffic channel signal of the mobile station 10, $V_1$, $V_2$ respectively to the receiving antenna gains of the base stations $21_1$, $21_2$, $-\beta$ to the attenuation factor per a unit distance, L to the distance between the base stations $21_1$, $21_2$, and x to the distance of the mobile station 10 from the base station $21_1$. In this case, the distance x at which the received levels of the traffic channel signals at the base stations $21_1$, $21_2$ become the same level Q is obtained by the following equation (2).

$$Q=(P-\beta x)V_1=(P-\beta(L-x))V_2 \quad (2)$$

$$\rightarrow x=(P(V_1-V_2)+\beta L)/(\beta(V_1+V_2))$$

Substituting this result into the equation (1), the received level S" of the perch channel signal of the base station $21_2$ at the time when the received level of the traffic channel signal of the mobile station 10 becomes Q is obtained as follows.

$$S''=W_2-\alpha(L-(P(V_1-V_2+\beta L)/(\beta(V_1+V_2))))$$

Thus, for each combination of an SHO source cell and an SHO destination candidate cell, when the attenuation factor of the perch channel signal transmitted from the base station concerned owing to distance from that base station, the attenuation factor of the traffic channel signal transmitted from the mobile station concerned owing to distance from that mobile station, and the distance between the base station of the SHO source cell and the base station of the SHO destination candidate cell are known, it is possible to obtain the difference (S'–S") used as a correction value by calculation based on the transmit powers of the perch channel signals of the respective base stations of the SHO source cell and the SHO destination candidate cell, the transmit powers of the traffic channel signal at the mobile station, and the receiving antenna gains of the respective base stations.

Returning to FIG. 3, description will be continued.

From the SHO correction value table storage unit 222, the SHO control unit 221 reads the correction value (S'–S") corresponding to the combination of the SHO source cell and SHO destination candidate cell, which is recognized from the SHO information (Step S1003). Then, the SHO control unit 221 uses the correction value to calculate an SHO-starting reference value that decides timing of starting SHO (namely, timing of starting communication with the base station 21 covering the SHO destination candidate cell, through a traffic channel signal), and to calculate an SHO-ending reference value that decides timing of ending SHO (namely, timing of ending communication with the base station 21 covering the SHO source cell through a traffic channel signal) (Step S1004). In detail, the SHO-starting reference value is calculated by subtracting the correction value (S'–S") from a reference value S set in advance (which is usually determined as the received level of the perch channel signal in the neighborhood of the cell boundary) for deciding timing of starting and ending SHO, Further, the SHO-ending reference value is calculated by adding the correction value (S'–S") to the reference value S.

Then, the SHO control unit 221 judges if the received level of the perch channel signal of the SHO destination candidate cell included in the SHO information is more than or equal to thus-calculated SHO-starting reference value (Step S1005). When the received level is less than the SHO-starting reference value, the flow returns to Step S1002, to repeat processing thereafter, based on the SHO information of the mobile station 10 in question, which is transmitted anew from the base station 21. On the other hand, when the received level is more than or equal to the SHO-starting reference value, SHO is started. Namely, the SHO control unit 221 controls the base station 21 that covers the SHO destination candidate cell, to start communication with the mobile station 10 in question using the traffic channel signal (Step S1006). By this, the mobile station 10 in question performs communication with the base station 21 covering the SHO source cell and communication with the base station 21 covering the SHO destination cell using the traffic channel signals, simultaneously. When the start of SHO is unsuccessful, the flow returns to Step S1002, to continue the processing thereafter.

When the SHO control unit 221 starts SHO, the SHO control unit 221 awaits that the received level of the perch channel signal of the SHO source cell included in the SHO information becomes less than the above-calculated SHO-ending reference value (Step S1007). When the received level becomes less than the SHO-ending reference value, the SHO control unit 221 ends SHO. Namely, the SHO control unit 221 controls the base station 21 of the SHO source cell to end the communication with the mobile station 10 in question using the traffic channel signal (Step S1008). By this, the mobile station 10 in question switches the communication partner from the base station 21 covering the SHO source cell to the base station 21 covering the SHO destination cell.

Hereinabove, the first embodiment of the present invention has been described.

In the present embodiment, the reference value used for comparison with the received level of the perch channel to judge timing of starting and ending SHO is corrected according to a combination of an SHO source cell and an SHO destination candidate cell, such that SHO is started when the mobile station 10 arrives at the range in which the mobile station 10 can communicate with the base station 21 covering the SHO destination candidate cell, and SHO is ended when the mobile station 10 in question comes out of the range in which the mobile station 10 can communicate with the base station 21 covering the SHO source cell. Accordingly, it is possible to lower the possibility of occurrence of an event that communication with the base station 21 covering the SHO destination candidate cell can not be established even when a start of SHO is tried, or an event that communication with the base station 21 covering the SHO source cell is disconnected immediately after a start of SHO. Thus, it is possible to efficiently prevent waste of resources owing to unnecessary burden on a base station and a network, which is caused by repeating a start and failure of SHO. Further, since it does not occur that SHO is ended immediately after starting SHO, it is possible to efficiently enjoy advantages of SHO such as stability of communication and reduction of transmit power.

Next, will be described a second embodiment of the present invention.

The present invention is different from the first embodiment in that each correction value of the SHO correction value table stored in the SHO correction value table storage unit 222 is modified based on the result of SHO performed according to the flow shown in FIG. 3. Accordingly, in the present invention, the SHO control unit 221 of the base station controller 22 further performs the below-described correction value update processing.

Figure 6:
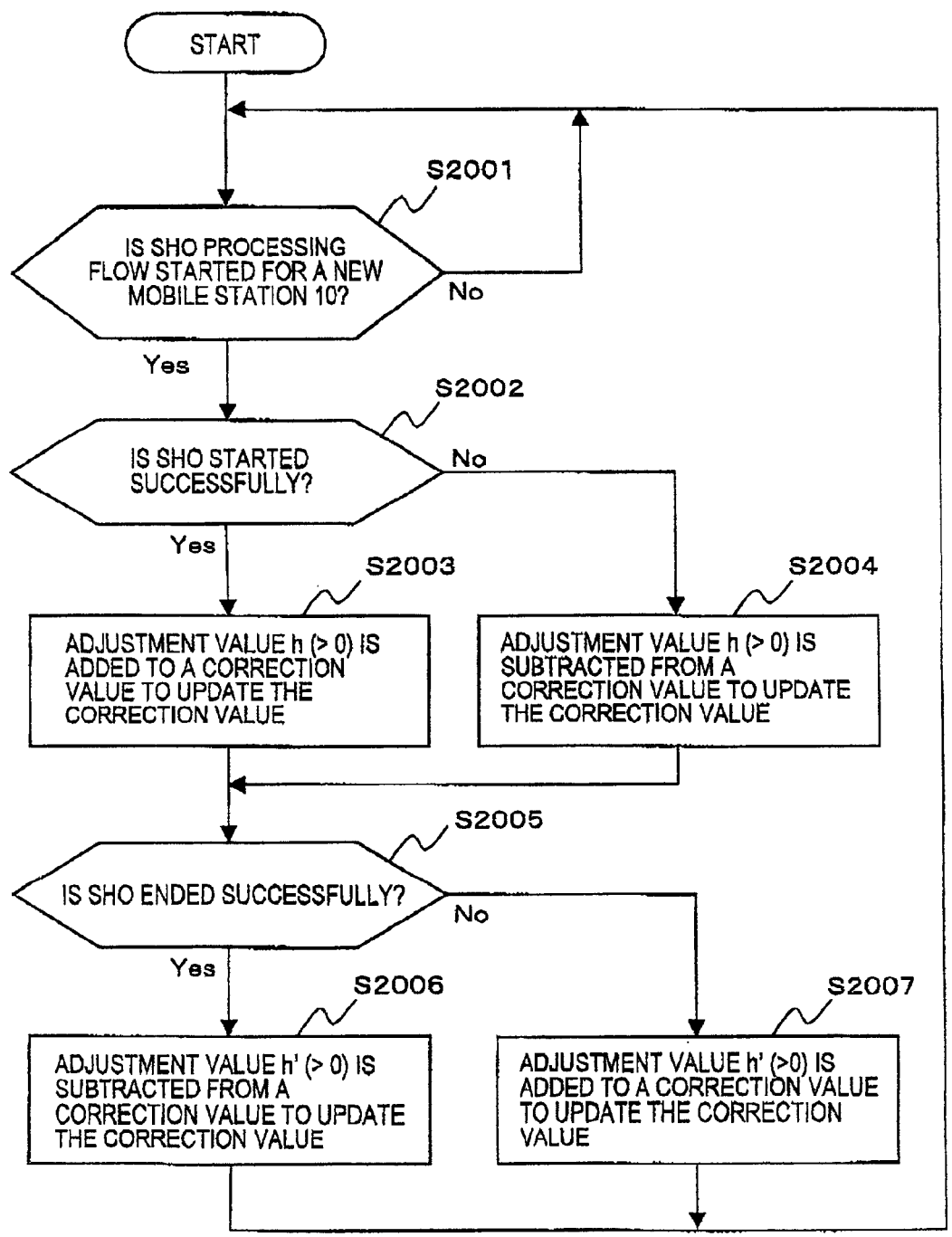
FIG. 6 is a flowchart for explaining correction value update processing that is performed in the SHO control unit 221 of the base station controller 22 shown in FIG. 2, in a second embodiment of the present invention.

FIG. 6 is a flowchart for explaining correction value update processing that is performed in the SHO control unit 221 of the base station controller 22, in the second embodiment of the present invention.

First, when Step S1002 and the following steps in the flow of the SHO processing shown in FIG. 3 are performed with respect to a mobile station 10 in communication with some base station 21 (Step S2001), the SHO control unit 221 monitors its state.

When the start of SHO (Step S1006 of FIG. 3) is successful (Yes in Step S2002: the case in which communication with the SHO destination candidate cell can be started), a predetermined adjustment value h (a positive value) is added to the correction value that is registered in association with the combination of the SHO source cell and the SHO destination candidate cell as the objects of SHO, and the sum is set as a new correction value (Step S2003). On the other hand, when the start of SHO is unsuccessful (No in Step S2002: the case in which communication with the SHO destination candidate cell can not be started), the above-mentioned predetermined adjustment value h is subtracted from the correction value that is registered in association with the combination of the SHO source cell and the SHO destination candidate cell as the objects of SHO, and the obtained number is set as a new correction value (Step S2004).

Further, when ending of SHO (Step S1008 in FIG. 3) is successful (Yes in Step S2005: the case in which communication with the SHO source cell can be ended according to an instruction to end SHO), a predetermined adjustment value h' (a positive value) is subtracted from the correction value registered in association with the combination of the SHO source cell and the SHO destination candidate cell as the objects of SHO, and the obtained number is set as a new correction value (Step S2006). On the other hand, when ending of SHO is unsuccessful (No in Step S2005: the case communication with the SHO source cell is disconnected before the instruction to end SHO), the above-mentioned predetermined adjustment value h' is added to the correction value registered in association with the combination of the SHO source cell and the SHO destination candidate cell as the objects of SHO, and the sum is set as a new correction value (Step S2007). Here, a same value may be used as the adjustment values h and h', or different values may be used.

Hereinabove, the second embodiment of the present invention has been described.

In the present embodiment, a correction value is updated depending on a result of SHO. Thus, according to the present embodiment, in addition to the effect of the above-described first embodiment, starting and ending of SHO can be performed more reliably, even when, for example, a range in which a base station can communicate (through a traffic channel) changes dynamically depending on the number of the communicating mobile stations 10, etc.

Next, a third embodiment of the present invention will be described.

In the above-described second embodiment, each time when the flow of the SHO processing shown in FIG. 3 is started, a correction value is updated depending on the result of starting or ending SHO in accordance with the flow. On the other hand, in the present embodiment, for each combination of an SHO source cell and an SHO destination candidate cell in the SHO correction value table stored in the SHO correction value table storage unit 222, results of predetermined times of performing SHO relating to the SHO source cell and SHO destination candidate cell in question are accumulated. And, depending on the contents of the results (a ratio between the number of successful times and the number of unsuccessful times), the correction value corresponding to the combination in question is updated.

FIG. 7 is a flowchart for explaining correction value update processing that is performed in the SHO control unit 221 of the base station controller 22 in the third embodiment of the present invention.

First, when Step S1002 and the following steps in the flow of the SHO processing shown in FIG. 3 are performed with respect to a mobile station 10 in communication with some base station 21 (Step S3001), the SHO control unit 221 updates a result table stored together with the SHO correction value table in the SHO correction value table storage unit 222, based on the results of starting SHO (Step S1006 of FIG. 3) and ending SHO (Step S1008 of FIG. 3) (Step S3002).

FIG. 8 shows an example of the result table stored in the SHO correction value table storage unit 222. As shown in the figure, for each cell covered by a base station 21 connected to its own base station controller 22, and for each combination of an SHO source cell 2221 and an SHO destination candidate cell 2222, the result table is entered with the number 2225 of performing SHO corresponding to that combination, the number 2226 of successful starts of SHO, and the number 2227 of successful ending of SHO.

For example, when SHO is performed for the cell 1 as the SHO source cell and the cell 2 as the SHO destination candidate cell, the number 2225 of performing SHO for that combination is incremented by 1. Further, when the start of SHO is successful, the number 2226 of successful start is incremented by 1, and when ending of SHO is successful, the number 2227 of successful ending is incremented by 1.

Next, the SHO control unit 221 looks into the result table to examine if there exists a combination of an SHO source cell and an SHO destination candidate cell for which the number 2225 of performing SHO becomes more than or equal to a predetermined number (Step S3003). When there exists such a combination, the correction value stored in the SHO correction value table in association with that combination is updated (Step S3004). In detail, a predetermined adjustment value h (>0) is multiplied with a value δ that corresponds to a ratio of the number 2226 of successful starts to the number 2225 of performing SHO, to obtain a value δ h. At the same time, a predetermined adjustment value h' (>0) is multiplied with a value γ that corresponds to a ratio of the number 2227 of successful ending to the number 2225 of performing SHO, to obtain a value γ h'. Then, the value γ h' is subtracted from the sum of the correction value for the above-mentioned combination and δ h, and the obtained value is registered as a new correction value for that combination into the SHO correction value table. Here, as the adjustment values h and h', may be used a same value, or different values.

Thereafter, the SHO control unit 221 clears all of the number 2225 of performing SHO, the number 2226 of successful starts, and the number 2227 of successful ending (Step S3005), and the flow returns to Step S3001.

Hereinabove, the third embodiment of the present invention has been described.

Also, according to the present embodiment, similarly to the above-described second embodiment, starting and ending of SHO can be performed more reliably, even when, for example, a range in which a base station can communicate (through a traffic channel) changes dynamically depending on the number of the communicating mobile stations 10, etc. The present embodiment uses the ratio of the number of successful starts to the number of performing SHO and the ratio of the number of successful ending to the number of performing SHO, to update a correction value. However, a ratio of the number of unsuccessful starts to the number of performing SHO and a ratio of the number of unsuccessful ending to the number of performing SHO may be used to update a correction value. Also, it does not matter to use a ratio of the number of unsuccessful starts to the number of successful starts and a ratio of unsuccessful ending to the number of successful ending.

Next, a fourth embodiment of the present invention will be described.

In the above-described first through third embodiments, a reference value, which is used for judging timing of starting and ending SHO, is corrected based on a correction value of the SHO correction value table stored in the SHO correction value table storage unit 222. On the other hand, in the present embodiment, a reference value for judging timing of starting and ending SHO is not corrected, but transmit power of the perch channel of a base station 21 is adjusted.

Figure 9:
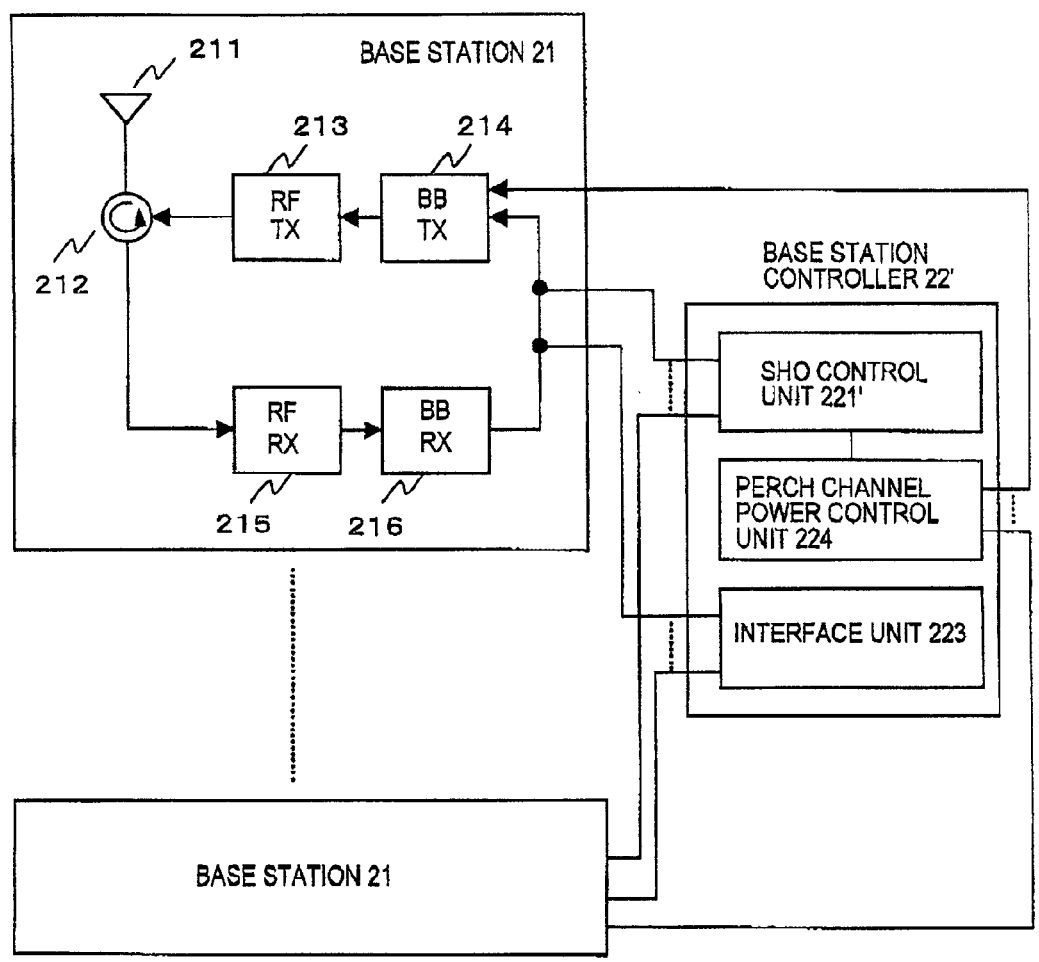
FIG. 9 is a block diagram showing a base station system 20 used in a cellular mobile communication system to which a fourth embodiment of the present invention is applied.

FIG. 9 is a block diagram showing a base station system 20 used in a cellular mobile communication system to which the fourth embodiment of the present invention is applied. In this figure, the same numeral or symbol refers to a component having the same function as in the base station system 20, shown in FIG. 2, used in the first through third embodiments.

As shown in the figure, the base station system 20 used in the present embodiment differs from the system shown in FIG. 2 in that a base station controller 22' is provided instead of the base station controller 22.

In the base station controller 22', an SHO control unit 221' performs the same processing as the SHO processing in the existing CDMA cellular mobile communication system. Namely, each time when SHO information of a mobile station 10 is transmitted from some base station 21, the SHO control unit 221' examines the received level of the perch channel signal of the SHO source cell and the received level of the perch channel signal of the SHO destination candidate cell included in the SHO information. When the received level of the perch channel signal of the SHO destination candidate cell becomes more than or equal to a reference value set in advance, SHO is started so that the base station 21 covering the SHO destination candidate cell starts communication with the above-mentioned mobile station 10. When, after starting SHO, the received level of the perch channel of the SHO source cell becomes less than the above-mentioned reference value, SHO is ended so that the base station 21 covering the SHO source cell ends communication with the above-mentioned mobile station 10.

A perch channel power control unit 224 controls transmit power of the perch channel signal transmitted from the base station 21, based on the result of SHO performed by the SHO control unit 221'.

Next, will be described perch channel power control processing performed in the perch channel power control unit 224 of the base station controller 22'.

Figure 10:
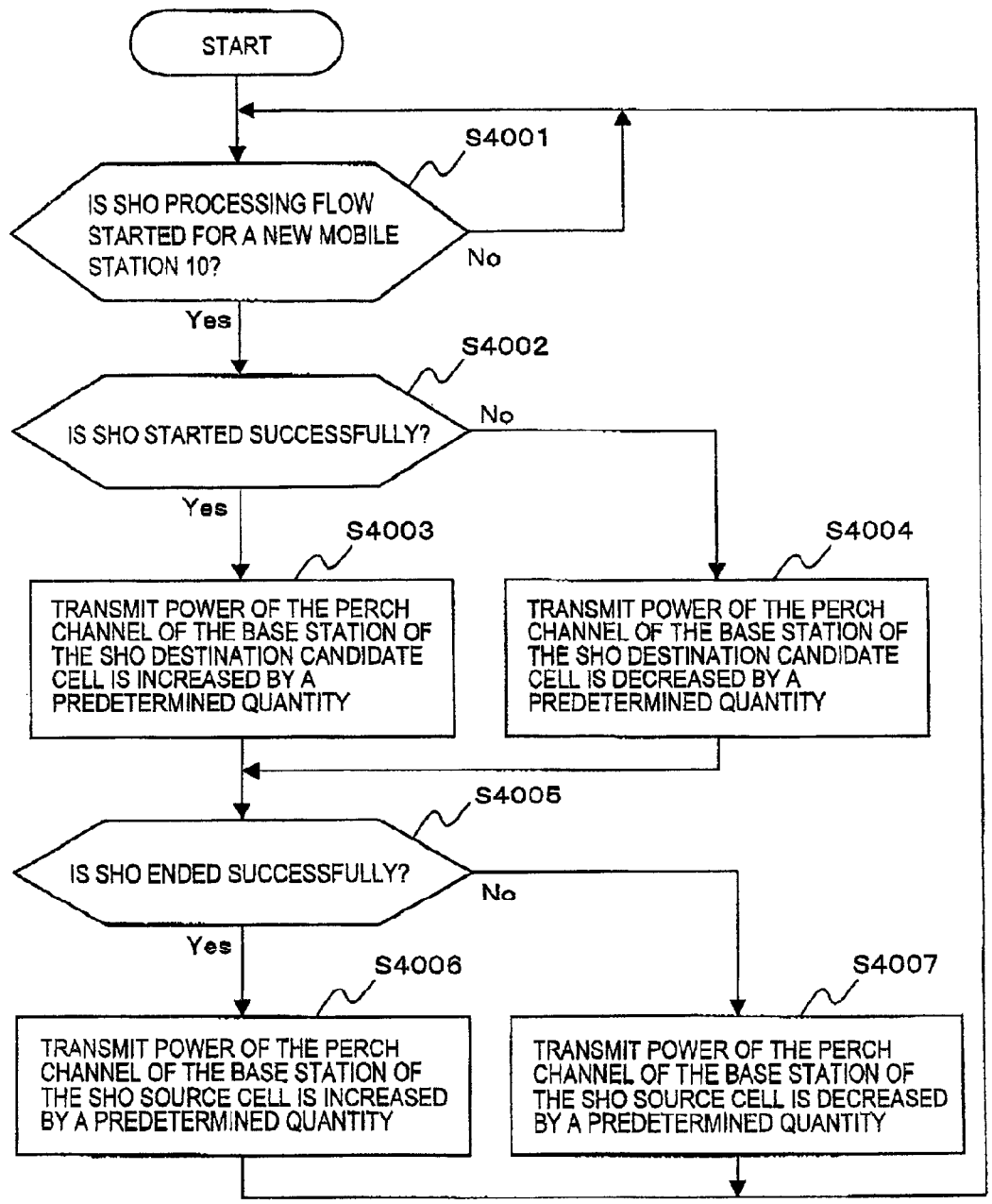
FIG. 10 is a flowchart for explaining perch channel power control processing performed in a perch channel power control unit 224 of a base station controller 22' shown in FIG. 9.

FIG. 10 is a flowchart for explaining perch channel power control processing performed in the perch channel control unit 224 of the base station controller 22'.

First, when the SHO control unit 221' performs SHO processing with respect to a mobile station 10 in communication with some base station 21 (Step S4001), the perch channel power control unit 224 monitors its state.

When the start of SHO is successful (Yes in Step S4002: the case in which communication with the SHO destination candidate cell can be started), the perch channel power control unit 224 controls the base station 21 covering the SHO destination candidate cell to increase the transmit power of the perch channel signal by a predetermined amount (Step S4003). On the other hand, when the start of SHO is unsuccessful (No in Step S4002: the case in which communication with the SHO destination candidate cell can not be started), the base station 21 covering the SHO destination candidate cell is controlled to reduce the transmit power of the perch channel signal by a predetermined amount (Step 54004).

Further, when ending of SHO is successful (Yes in Step S4005: the case in which communication with the SHO source cell can be ended according to an instruction to end SHO), the base station 21 covering the SHO source cell is controlled to increase the transmit power of the perch channel signal by a predetermined amount (Step S4006). On the other hand, when ending of SHO is unsuccessful (No in Step S4005: the case in which communication with the SHO source cell is disconnected before the instruction to end SHO), the bas station 21 covering the SHO source cell is controlled to decrease the transmit power of the perch channel by a predetermined amount (Step S4007).

Hereinabove, the fourth embodiment of the present invention has been described.

In the present embodiment, transmit power of the perch channel of a base station 21 is adjusted depending on a result of SHO, such that the range of the cell covered by the base station 21 in question coincide with the range in which the base station 21 in question can communicate. Accordingly, it is possible to lower the possibility of occurrence of an event that communication with the base station 21 covering the SHO destination candidate cell can not be established even when a start of SHO is tried, or an event that communication with the base station 21 covering the SHO source cell is disconnected immediately after a start of SHO. Thus, it is possible to efficiently prevent waste of resources owing to unnecessary burden on a base station and a network, which is caused by repeating a start and failure of SHO. Further, since it does not occur that SHO is ended immediately after starting SHO, it is possible to efficiently enjoy advantages of SHO such as stability of communication and reduction of transmit power. In addition, according to the present embodiment, transmit power of the perch channel signal is adjusted depending on a result of SHO, starting and ending of SHO can be performed reliably, even when, for example, a range in which a base station can communicate (through a traffic channel signal) changes dynamically depending on the number of the communicating mobile stations 10, etc.

In the present embodiment, each time when SHO processing is performed by the SHO control unit 221', transmit power of the perch channel is adjusted depending on a result of SHO. However, similarly to the above-described third embodiment, for each combination of an SHO source cell and an SHO destination candidate cell, results of predetermined times of performing SHO relating to the SHO source cell and SHO destination candidate cell in question may be accumulated. And, depending on the contents of the results (a ratio between the number of successful times and the number of unsuccessful times), the transmit power of the perch channel of each base station 21 covering the SHO source cell or SHO destination candidate cell may be adjusted.

Next, a fifth embodiment of the present invention will be described.

In the above-described first through third embodiments, the SHO processing is performed at the initiative of a base station 20. On the other hand, in the present embodiment, SHO processing is performed at the initiative of a mobile station 10.

Figure 11:
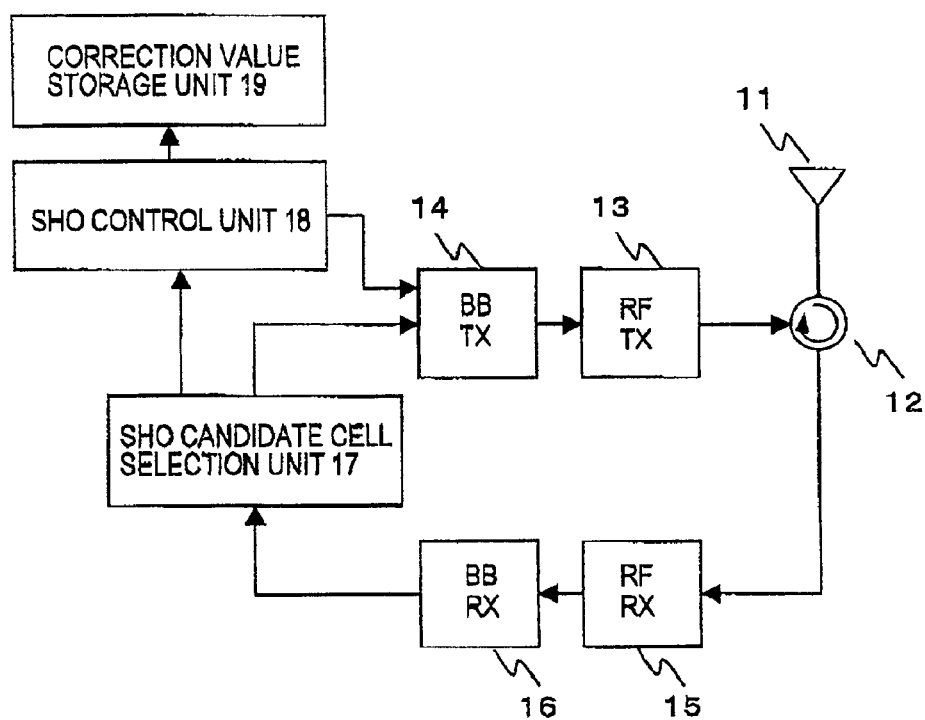
FIG. 11 is a block diagram showing a mobile station 10' used in a cellular mobile communication system to which a fifth embodiment of the present invention is applied.

FIG. 11 is a block diagram showing a mobile station 10' used in a cellular mobile communication system to which the fifth embodiment of the present invention is applied.

This mobile station 10' is different from the mobile station 10 shown in FIG. 1 of the first through third embodiments, in that an SHO control unit 18 and a correction value storage unit 19 are provided, and that the SHO candidate cell selection unit 17 notifies the mobile station base band transmitting unit 14 of only the received level of the perch channel signal of the cell (SHO source cell) with which the mobile station 10 itself is in communication (communication through a traffic channel signal), and the mobile station base band transmitting unit 14, which has received the notification, generates SHO information that includes only the received level of the perch channel signal of the SHO source cell.

Figure 12:
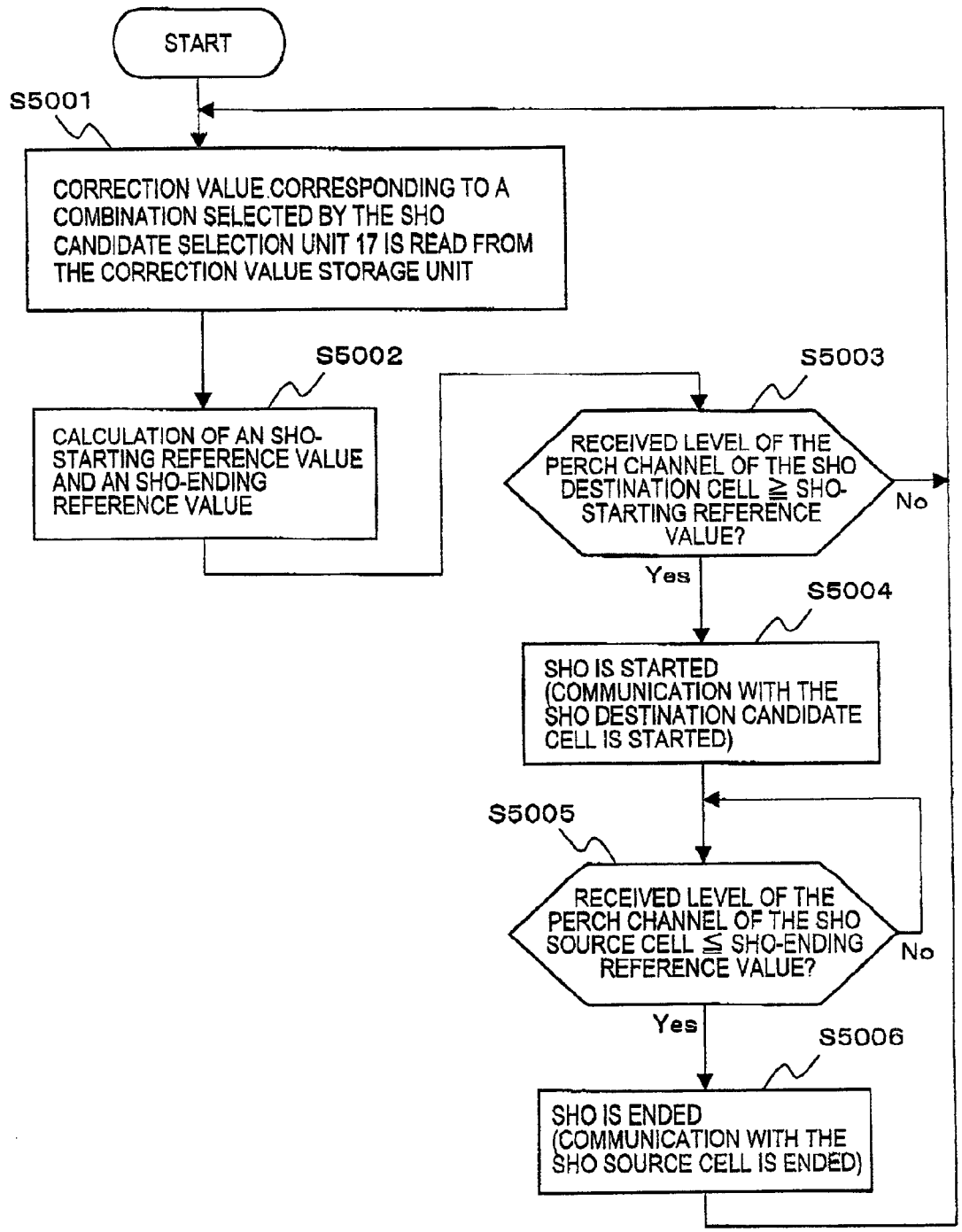
FIG. 12 is a flowchart for explaining SHO processing that is performed in an SHO control unit 18 of the mobile station 10' shown in FIG. 11.

In the mobile station 10', the SHO control unit 18 stores correction values corresponding to a plurality of combinations of the SHO source cell and an SHO destination candidate cell, into the correction value storage unit 19. The mentioned SHO source cell is the cell of the base station 21 with which the mobile station 10 itself is communicating. And, those combinations are notified from the base station controller 22 through the base station 21 in question. When the SHO candidate cell selection unit 17 extracts the received level of the perch channel signal of the SHO source cell and the received level of the perch channel signal of the cell (SHO destination candidate cell) that has the largest measurement over a predetermined value among the cells other than the SHO source cell, the flow shown in FIG. 12 is performed.

Namely, from the correction value storage unit 19, the SHO control unit 18 reads the correction value corresponding to the combination of the SHO source cell and the SHO destination candidate cell extracted by the SHO candidate cell selection unit 17 (Step S5001). Then, using that correction value, the SHO control unit 18 calculates an SHO-starting reference value that decides timing of starting SHO (namely, timing of starting communication with the SHO destination candidate cell through a traffic channel signal), and calculates an SHO-ending reference value that decides timing of ending SHO (namely, timing of ending communication with the SHO source cell through a traffic channel signal) (Step S5002).

Then, the SHO control unit 18 judges if the received level of the perch channel signal of the SHO destination candidate cell, which is extracted by the SHO candidate cell selection unit 17, is more than or equal to the previously-calculated SHO-starting reference value (Step S5003). When the received level is less than the SHO-starting reference values, the flow returns to Step S5001, to perform above-described processing with respect to the received level of the perch channel signal of the SHO source cell, which is extracted anew by the SHO candidate cell selection unit 17. On the other hand, when the received level is more than or equal to the SHO-starting reference value, SHO is started. Namely, SHO control unit 18 controls the mobile station 10' to start communication with the base station 21 covering the SHO destination candidate cell using the traffic channel signal (Step S5004). By this, the mobile station 10' in question performs communication with the base station 21 covering the SHO source cell and communication with the base station 21 covering the SHO destination cell using the traffic channel signals, simultaneously. When the start of SHO is unsuccessful, the flow returns to Step S5001, to perform the above-described processing with respect to the received level of the perch channel signal of the SHO source cell and the received level of the perch channel signal of the SHO destination candidate cell, which is extracted anew by the SHO candidate cell selection unit 17. Further, the result of starting SHO (success or failure) is notified together with information for specifying the combination of the SHO source cell and the SHO destination candidate cell as the objects of SHO in question, to the base station 21 in communication (base station covering the SHO source cell) through the mobile station base band transmitting unit 14, the mobile station radio transmitting unit 13, etc.

Now, when SHO is started, the SHO control unit 18 awaits that the received level of the perch channel signal of the SHO source cell, which is extracted anew by the SHO candidate cell selection unit 17, becomes less than the above-calculated SHO-ending reference value (Step S5005). When the received level becomes less than the SHO-ending reference value, SHO is ended. Namely, the SHO control unit 18 controls the mobile station 10' to end the communication with the base station 21 covering the SHO source cell using the traffic channel signal (Step S5006). By this, the mobile station 10' switches the communication partner from the base station 21 covering the SHO source cell to the base station 21 covering the SHO destination cell. Here, when the communication with the base station 21 covering the SHO source cell is disconnected before ending SHO, the flow returns to Step S5001, to perform the above-described processing with respect to the received level of the perch channel signal of the SHO source cell and the received level of the perch channel signal of the SHO destination candidate cell, which are extracted anew by the SHO candidate cell selection unit 17. Further, the result of ending SHO (success or failure) is notified together with information for specifying the combination of the SHO source cell and the SHO destination candidate cell as the objects of SHO, to the base station 21 in communication (base station covering the SHO destination candidate cell) through the mobile station base band transmitting unit 14, the mobile station radio transmitting unit 13, etc.

Figure 13:
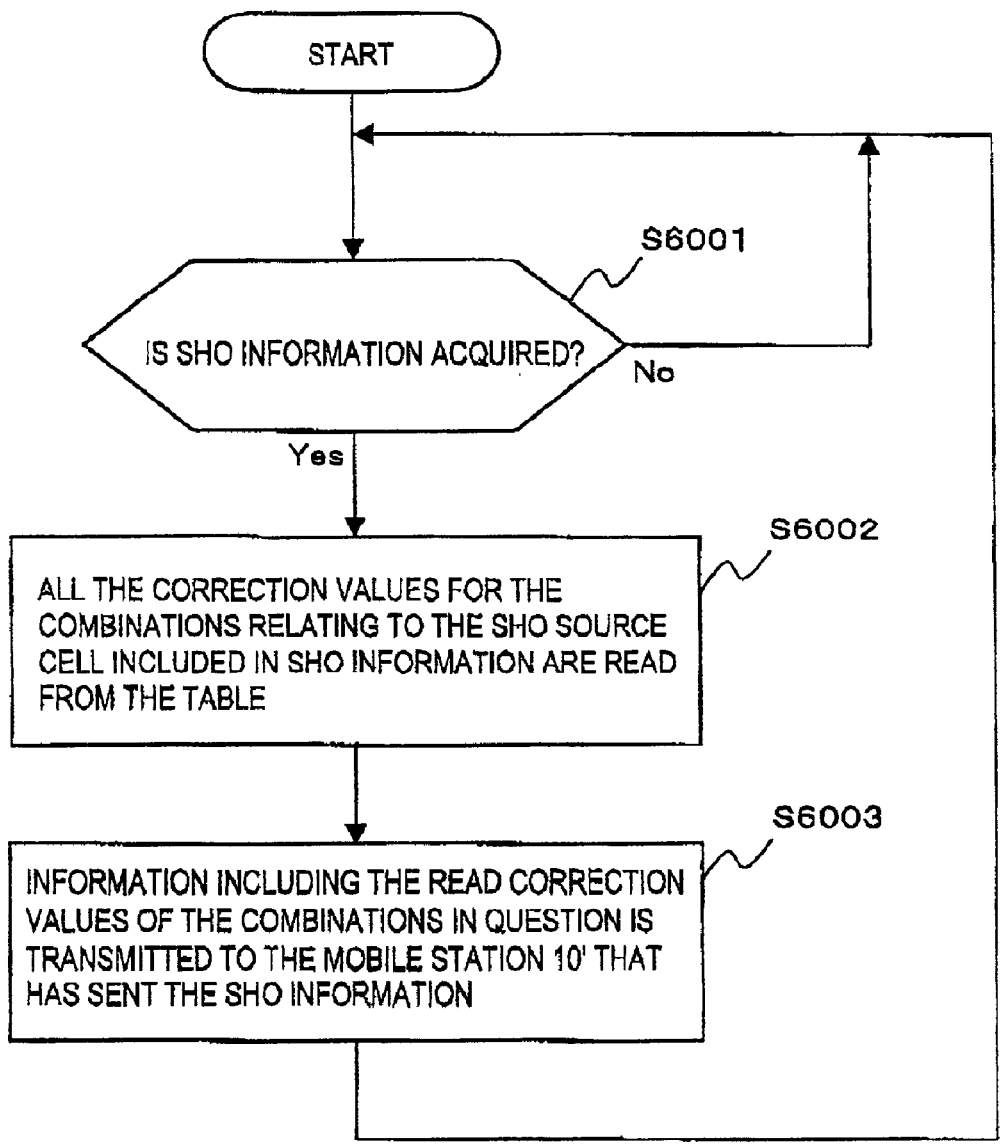
FIG. 13 is a flowchart for explaining processing performed in the SHO control unit 221 of the base station controller 22, in the fifth embodiment of the present invention.
Figure 14:
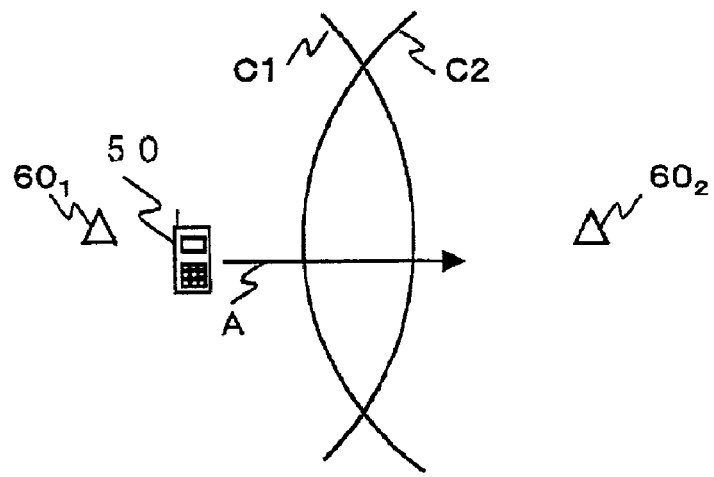
FIG. 14 is a diagram showing an outline of the conventional SHO.
Figure 15:
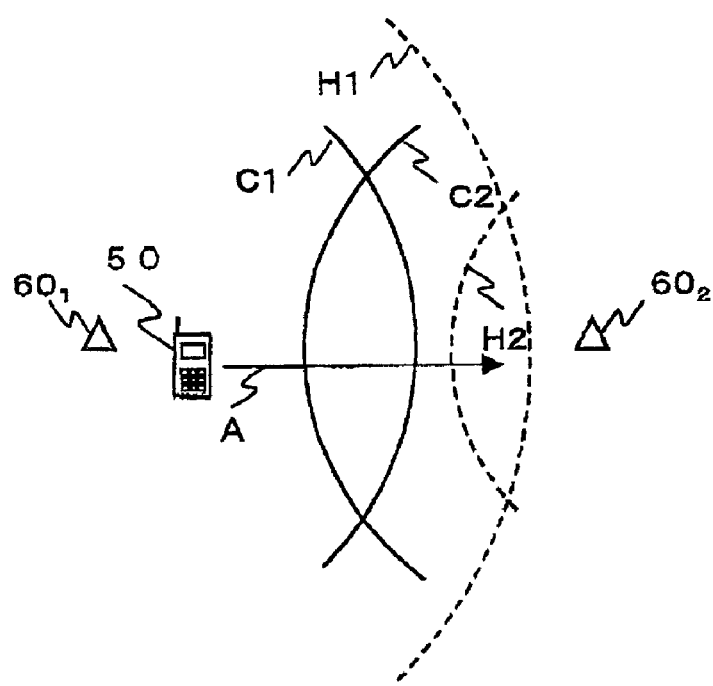
FIG. 15 is a diagram for explaining a problem in the case in which the conventional SHO is performed in a state that there exists discrepancy between the range of a cell covered by a base station and the range in which the base station in question can actually communicate.
Figure 16:
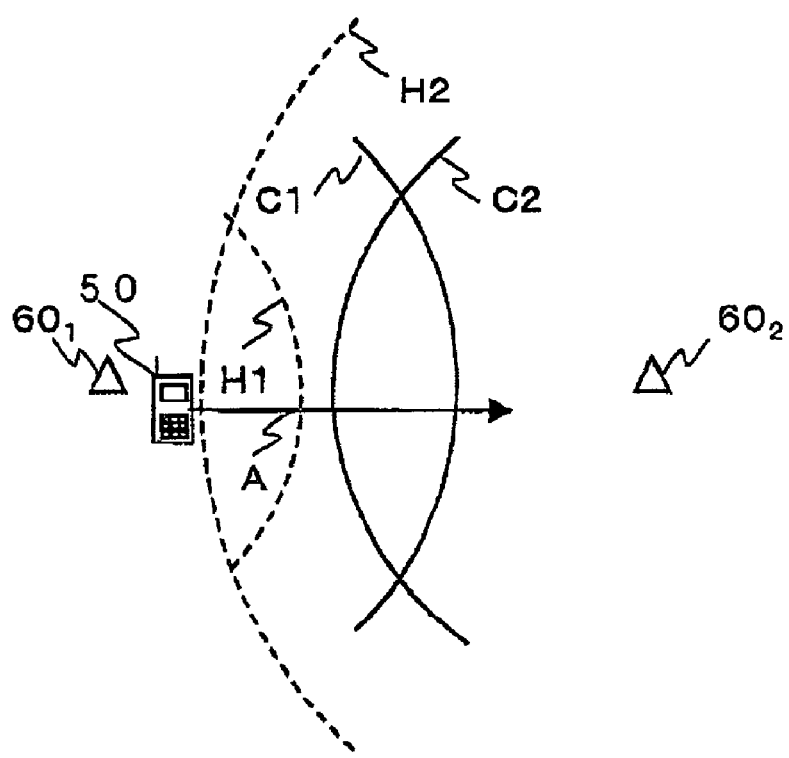
FIG. 16 is a diagram for explaining a problem in the case in which the conventional SHO is performed in a state that there exists discrepancy between the range of a cell covered by a base station and the range in which the base station in question can actually communicate.

In the present embodiment, the base station controller 22 does not perform the flow shown in FIG. 3. Instead, the SHO control unit 221 of the base station controller 22 performs the flow shown in FIG. 13.

Namely, when the SHO control unit 221 receives SHO information from the mobile station 10' through some base station 21 (Step S6001), the SHO control unit 221 reads all the correction values corresponding to the combinations relating to the SHO source cell included in the SHO information in question, from the SHO correction value table storage unit 222 (Step S6002). Then, information including the respective correction values for those combinations is transmitted to the mobile station 10' in question through the base station 21 in communication with that mobile station 10' (Step 56003).

Further, in the present embodiment, when the flow shown in FIG. 6 is performed, the following processing is performed in place of Step S2001. Namely, each time when a result of starting or ending SHO is transmitted from the mobile station 10' through some base station 21, processing in Step S2002 and the following steps is performed. Similarly, when the flow shown in FIG. 7 is performed, the following processing is performed in place of Step S3001. Namely, each time when a result of starting or ending SHO is transmitted from the mobile station 10' through some base station 21, processing in the Step S3002 and the following steps is performed.

Hereinabove, the fifth embodiment of the present invention has been described.

In the present embodiment, the SHO processing performed at the initiative of a base station 20 in the above-described first through third embodiments is performed at the initiative of a mobile station 10'. Of course, the SHO processing performed at the initiative of a base station 20 in the above-described fourth embodiment can be performed at the initiative of the mobile station 10', also. In that case, the SHO control unit 221' of the base station controller 22' is unnecessary. Further, it is sufficient that the perch channel power control unit 224 of the base station controller 22' performs the processing in Step S4002 and the following steps shown in FIG. 10, based on the result of starting or ending SHO transmitted through some base station 21.

Hereinabove, various embodiments of the present invention have been described.

However, the present invention is not limited to the above-described embodiments, and many variations can be provided within the gist of the invention.

For example, the above embodiments have been described with respect to SHO between cells. However, the present invention can be applied to SHO between a cell and a sector, or between sectors. In that case, a correction value in the above first through third and fifth embodiments is prepared for each combination of an SHO source cell or an SHO source sector and an SHO destination candidate cell or an SHO destination candidate sector. Further, the control of transmit power of a perch channel signal in the above-described fourth embodiment is performed for each perch channel that decides a range of an SHO destination candidate cell or an SHO destination candidate sector, based on a result of starting SHO, or performed for each perch channel that decides a range of an SHO source cell or an SHO source sector, based on a result of ending SHO.

Further, in the above-described first through third and fifth embodiments, the correction value for correcting the reference value used for judging timing of starting or ending SHO is prepared for each combination of an SHO source cell and an SHO destination candidate cell. However, the present invention is not limited to this.

For example, it is possible that each cell is provided with a first correction value for correcting a reference value used for judging timing of starting SHO and a second correction value for correcting a reference value for judging timing of ending SHO. And, in processing SHO, the timing of starting SHO may be judged using the reference value corrected by the first correction value for the SHO destination candidate cell, and the timing of ending SHO may be judged using the reference value corrected by the second correction value for the SHO source cell.

As described above, according to the present invention, hand over can be performed more reliably, even when there exists discrepancy between a range of a cell or sector and a range in which communication is possible.

What is claimed is:

1. A method of controlling hand over in a mobile communication system comprising a mobile station, a plurality of base stations each communicating with the mobile station, and a base station controller controlling the plurality of base stations, said method comprising:

each of the plurality of base stations transmitting a perch channel signal which decides a range of a cell (sector) to be covered by one base station to the mobile station;

the mobile station measuring a received level of the perch channel signal when the signal is received from the plurality of base stations, and based on a result of the measurement, transmitting information on a hand over source cell (source sector), a hand over destination candidate cell (candidate sector) and on the received level of the perch channel signal associated with these cells (sectors) to each of the base stations;

each of the base stations transmitting the information to the base station controller when the information is received from the mobile station; and when the base station controller receives the information from the mobile station through the plurality of base stations, the controller performing the steps of:

reading a correction value stored in a storage unit based on information on the hand over source cell (source sector) and the hand over destination candidate cell (candidate sector) contained in the information, the correction value being used to correct a reference value of the received signal level necessary for controlling the hand over;

correcting the reference value with the correction value; and controlling the hand over based on the corrected reference value and the received signal level of the perch channel signal contained in the information from the mobile station.

2. The method of controlling hand over according to claim 1, wherein the base station controller updates the correction value stored in the storage unit based on the result of hand over performed.

3. A method of controlling hand over according to claim 2, wherein the base station controller controls transmission power of the perch channel signal depending on the hand over performed.

4. The method of controlling hand over according to claim 1, wherein the correction value is a tabulated correction value stored in a correction value table having a plurality of correction values arranged according to hand over source cells (source sectors) and hand over destination candidate cells (candidate sectors).

5. A base station controller in a mobile communications system comprising a mobile station, a plurality of base stations which each communicate with the mobile station, and the base station controller controlling the plurality of base stations, the base station controller comprising:

a storage unit that stores a correction value used for correcting a reference value of a received signal level necessary for controlling hand over;

an interface unit which receives information outputted from the mobile station through the plurality of base stations, the information being necessary for controlling hand over; and a control unit which reads the correction value stored in the storage unit based on information on the hand over source cell (source sector) and on the hand over destination candidate cell (candidate sector) contained in the information received by the interface unit, corrects the reference value with the correction value; and controls the hand over based on the corrected reference value and the received signal level of the perch channel signal contained in the information from the mobile station.

6. A base station controller according to claim 5, wherein:

the control unit updates the correction value stored in the storage unit based on hand over performed.

7. A base station controller according to claim 6, wherein:

the control unit controls transmitting power of the perch channel signal depending on the result of hand over performed.

8. The base station controller according to claim 5, wherein the correction value is a tabulated correction value stored in a correction value table having a plurality of correction values arranged according to hand over source cells (source sectors) and hand over destination candidate cells (candidate sectors).

9. A mobile station in a mobile communication system which comprises the mobile station, a plurality of base stations which each communicate with the mobile station, and a base station controller controlling the plurality of base stations, the mobile station comprising:

a storage unit that stores a correction value used for correcting a reference value of a received signal level necessary for controlling hand over; and a control unit which measures a received level of a perch channel signal when the signal is received from the plurality of base stations, selects a candidate cell (candidate sector) for hand over based on the measured result, reads the correction value stored in the storage unit based on information on the hand over source cell (source sector) and on the hand over destination candidate cell (candidate sector) to correct the reference value with the correction value, and controls hand over based on the corrected reference value and the received signal level of the perch channel signal of the hand over source cell (source sector) and hand over destination cell (candidate sector).

10. The mobile station according to claim 9, wherein the correction value is a tabulated correction value stored in a correction value table having a plurality of correction values arranged according to hand over source cells (source sectors) and hand over destination candidate cells (candidate sectors).

11. The mobile station according to claim 9, wherein the control unit notifies the base stations under communication of the result of the hand over performed.

* * * * *